US012666377B2

(12) United States Patent
Ryu et al.

(10) Patent No.: US 12,666,377 B2
(45) Date of Patent: Jun. 23, 2026

(54) DOWNLINK LOOP OPERATION IN A NON-TERRESTRIAL NETWORK

(71) Applicant: QUALCOMM Incorporated, San Diego, CA (US)

(72) Inventors: Jae Ho Ryu, San Diego, CA (US); Hari Sankar, San Diego, CA (US); Paolo Minero, La Jolla, CA (US); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1044 days.

(21) Appl. No.: 17/807,033

(22) Filed: Jun. 15, 2022

(65) Prior Publication Data

US 2023/0413203 A1      Dec. 21, 2023

(51) Int. Cl.
*H04W 56/00*        (2009.01)
*H04W 72/0446*    (2023.01)
*H04W 72/23*        (2023.01)

(52) U.S. Cl.
CPC ...  *H04W 56/0045* (2013.01); *H04W 72/0446* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2016/0278033 A1* | 9/2016 | Wu | .................... | H04W 56/0045 |
| 2019/0353800 A1* | 11/2019 | Nirula | ..................... | G01S 19/40 |
| 2021/0250885 A1 | 8/2021 | Medles et al. | | |
| 2022/0046566 A1* | 2/2022 | Leng | ................ | H04W 56/0045 |
| 2023/0308172 A1* | 9/2023 | Lin | ..................... | H04B 7/18519 |
| 2024/0064583 A1* | 2/2024 | Maattanen | ........ | H04W 36/0072 |
| 2024/0292347 A1* | 8/2024 | Manolakis | ......... | H04B 7/18513 |

FOREIGN PATENT DOCUMENTS

WO          2022112840 A2      6/2022

OTHER PUBLICATIONS

International Search Report and Written Opinion—PCT/US2023/022894—ISA/EPO—Sep. 18, 2023.

* cited by examiner

*Primary Examiner* — Srinivasa R Reddivalam
(74) *Attorney, Agent, or Firm* — Harrity & Harrity, LLP

(57) ABSTRACT

Various aspects of the present disclosure generally relate to wireless communication. In some aspects, a user equipment (UE) may receive ephemeris information associated with a satellite and a timing advance parameter associated with the satellite. The UE may modify, based at least in part on the ephemeris information, at least one of: a downlink frequency tracking loop (FTL), or a downlink time tracking loop (TTL). The UE may receive a downlink signal from the satellite based at least in part on modifying the downlink FTL or the downlink TTL. Numerous other aspects are described.

30 Claims, 7 Drawing Sheets

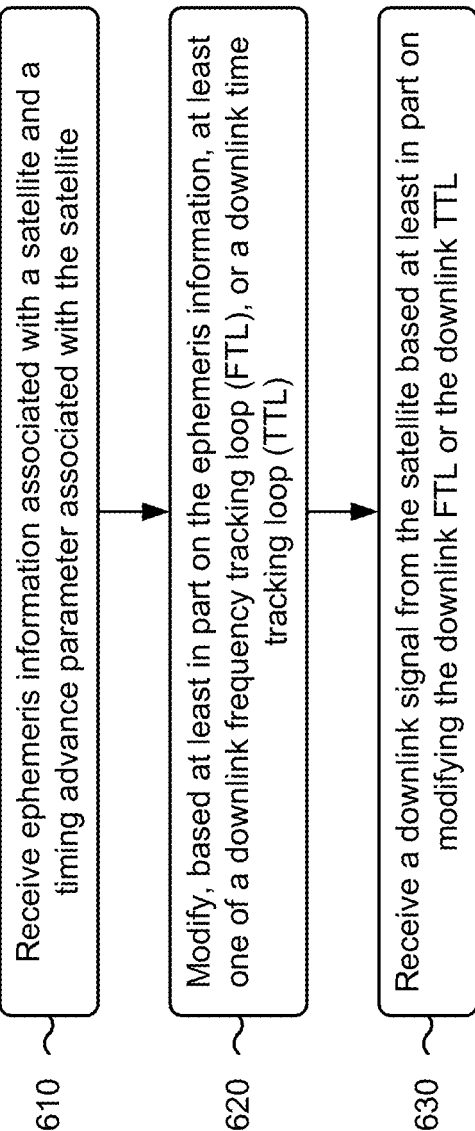

610 — Receive ephemeris information associated with a satellite and a timing advance parameter associated with the satellite 620 — Modify, based at least in part on the ephemeris information, at least one of a downlink frequency tracking loop (FTL), or a downlink time tracking loop (TTL)

630 — Receive a downlink signal from the satellite based at least in part on modifying the downlink FTL or the downlink TTL

600

FIG. 6

DOWNLINK LOOP OPERATION IN A NON-TERRESTRIAL NETWORK

FIELD OF THE DISCLOSURE

Aspects of the present disclosure generally relate to wireless communication and to techniques and apparatuses for downlink loop operation in a non-terrestrial network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving ephemeris information associated with a satellite and a timing advance parameter associated with the satellite. The method may include modifying, based at least in part on the ephemeris information, at least one of a downlink frequency tracking loop (FTL) or a downlink time tracking loop (TTL). The method may include receiving a downlink signal from the satellite based at least in part on modifying the downlink FTL or the downlink TTL.

Some aspects described herein relate to an apparatus for wireless communication at a UE. The apparatus may include a memory and one or more processors coupled to the memory. The one or more processors may be configured to receive ephemeris information associated with a satellite and a timing advance parameter associated with the satellite. The one or more processors may be configured to modify, based at least in part on the ephemeris information, at least one of a downlink FTL or a downlink TTL. The one or more processors may be configured to receive a downlink signal from the satellite based at least in part on modifying the downlink FTL or the downlink TTL.

Some aspects described herein relate to a non-transitory computer-readable medium that stores a set of instructions for wireless communication by a UE. The set of instructions, when executed by one or more processors of the UE, may cause the UE to receive ephemeris information associated with a satellite and a timing advance parameter associated with the satellite. The set of instructions, when executed by one or more processors of the UE, may cause the UE to modify, based at least in part on the ephemeris information, at least one of a downlink FTL or a downlink TTL. The set of instructions, when executed by one or more processors of the UE, may cause the UE to receive a downlink signal from the satellite based at least in part on modifying the downlink FTL or the downlink TTL.

Some aspects described herein relate to an apparatus for wireless communication. The apparatus may include means for receiving ephemeris information associated with a satellite and a timing advance parameter associated with the satellite. The apparatus may include means for modifying, based at least in part on the ephemeris information, at least one of a downlink FTL or a downlink TTL. The apparatus may include means for receiving a downlink signal from the satellite based at least in part on modifying the downlink FTL or the downlink TTL.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
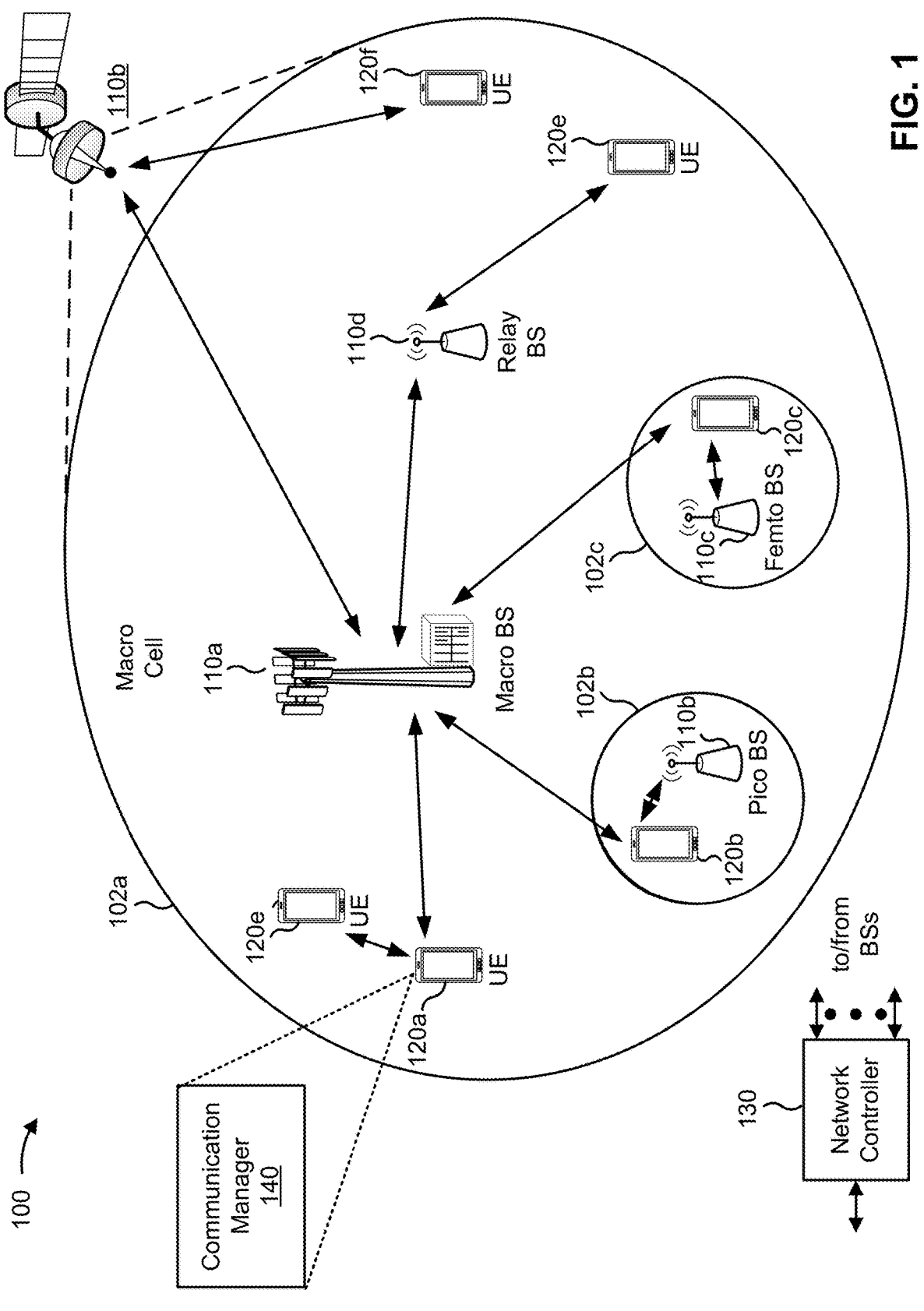
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

In some examples, and as shown by FIG. 1, a cell may be provided by the non-terrestrial network node 110*b* of a non-terrestrial network (NTN). The non-terrestrial network node 110*b* may also be referred to as a non-terrestrial base station or a non-terrestrial access point. "NTN" may denote a network that may be accessed based at least in part on a non-terrestrial network node (e.g., the non-terrestrial network node 110*b*). In some NTN deployments, the non-terrestrial network node 110*b* may be located on an airborne platform or a platform in orbit. Examples of such platforms include a satellite (e.g., a low earth orbit (LEO) satellite, a medium earth orbit (MEO) satellite, and/or a geostationary orbit (GEO) satellite), a balloon, a dirigible, an airplane, an unmanned aerial vehicle (UAV), and/or a drone.

Alternatively or additionally, in some NTN deployments (e.g., a transparent architecture or a bent pipe architecture), the non-terrestrial network node 110*b* may act as a relay station to relay communications between a UE 120 and the terrestrial network node 110*a* (e.g., a terrestrial base station located on the ground or on a tower). In this case, the non-terrestrial network node 110*b* may perform frequency translation and/or radio frequency amplification for communications relayed between the UE 120 and the terrestrial network node 110*a*. For example, the UE 120 may transmit an uplink communication to the non-terrestrial network node 110*b*, which may relay the uplink communication to the terrestrial network node 110*a* (e.g., after performing frequency translation and/or radio frequency amplification). The terrestrial network node 110*a* may perform additional processing on the uplink communication and/or may transmit the uplink communication to a core network. As another example, the terrestrial network node 110*a* may transmit a downlink communication to the non-terrestrial network node 110*b*, which may relay the downlink communication to the UE 120 (e.g., after performing frequency translation and/or radio frequency amplification). In some aspects, a UE 120 and/or the terrestrial network node 110*a* may be referred to as a ground station (GS).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive ephemeris information associated with a satellite and a timing advance parameter associated with the satellite; modify, based at least in part on the ephemeris information, at least one of a downlink FTL or a downlink TTL, and receive a downlink signal from the satellite based at least in part on modifying the downlink FTL or the downlink TTL.

Additionally, or alternatively, the communication manager 140 may perform one or more other operations described herein.

As indicated above, FIG. 1 is provided as an example. Other examples may differ from what is described with regard to FIG. 1.

Figure 2:
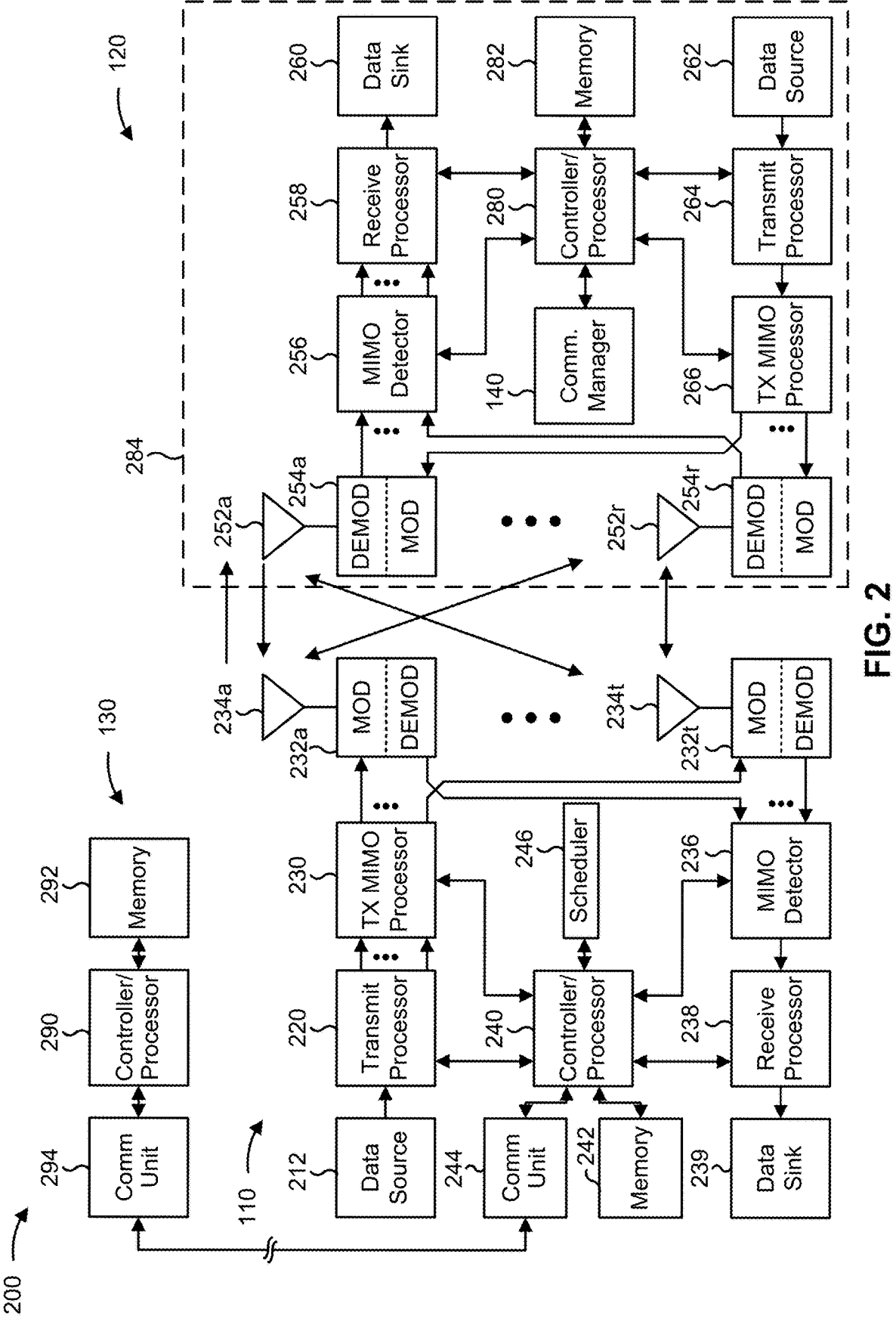
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-7).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-7).

The controller/processor 240 of the network node 110, the controller/processor 280 of the UE 120, and/or any other component(s) of FIG. 2 may perform one or more techniques associated with downlink loop operation in a non-terrestrial network, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, a UE (e.g. the UE 120) includes means for receiving ephemeris information associated with a satellite and a timing advance parameter associated with the satellite; means for modifying, based at least in part on the ephemeris information, at least one of a downlink FTL or a downlink TTL; and/or means for receiving a downlink signal from the satellite based at least in part on modifying the downlink FTL or the downlink TTL. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station (BS), a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
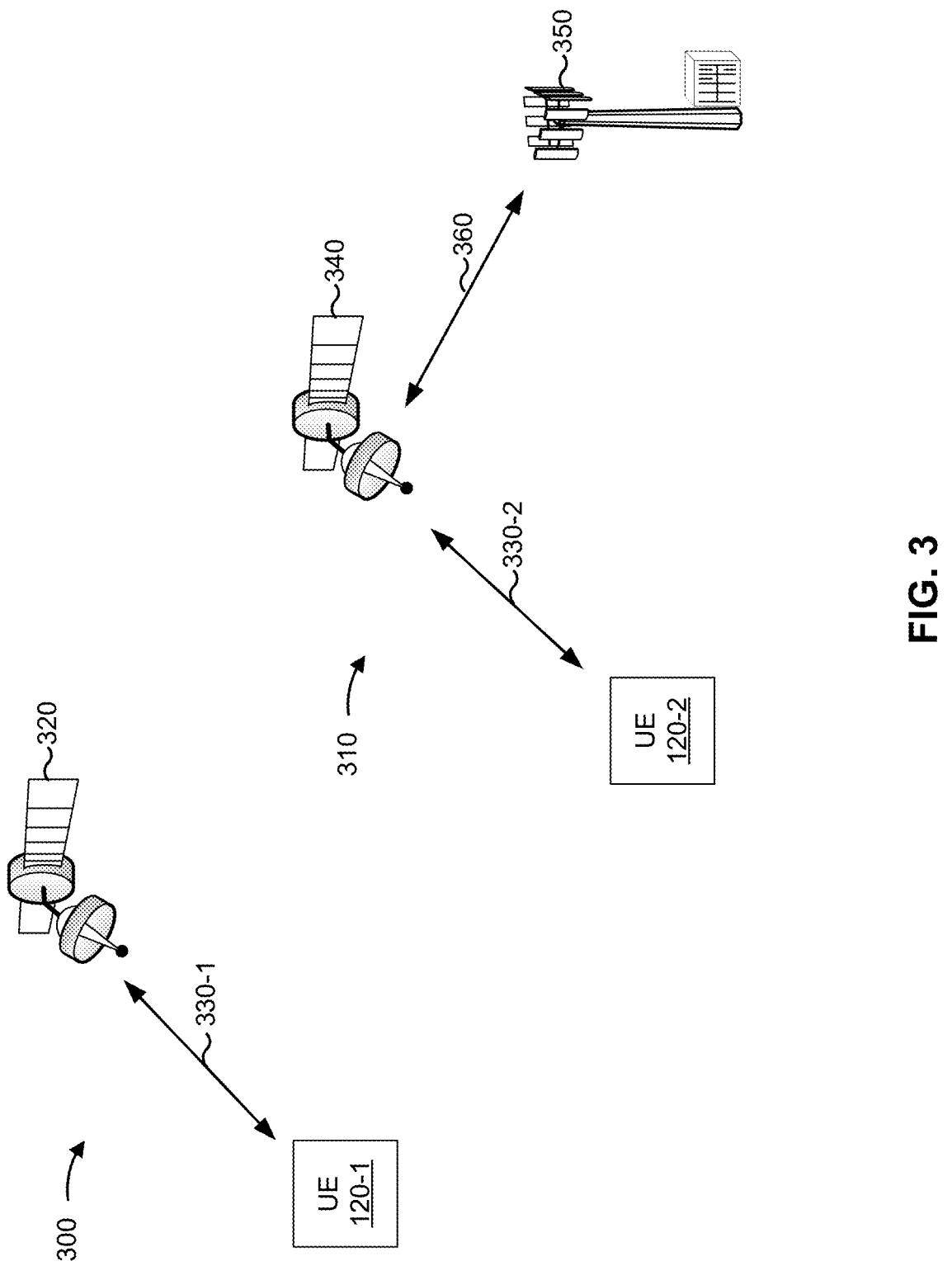
FIG. 3 is a diagram illustrating an example of a regenerative satellite deployment and an example of a transparent satellite deployment in a non-terrestrial network.

FIG. 3 is a diagram illustrating an example 300 of a regenerative satellite deployment and an example 310 of a transparent satellite deployment in a non-terrestrial network.

Example 300 shows a regenerative satellite deployment in which a first UE 120-1 is served by a satellite 320 via a service link 330-1. In some aspects, the satellite 320 may include base station capabilities (e.g., capabilities associated with the network node 110a and/or a gNB), and may be referred to as a non-terrestrial base station, a regenerative repeater, or an on-board processing repeater. Based at least in part on including the base station capabilities, the satellite 320 may demodulate an uplink radio frequency signal, and may modulate a baseband signal derived from the uplink radio signal to produce a downlink radio frequency transmission. To illustrate, the satellite 320 may transmit the downlink radio frequency signal on the service link 330-1. The satellite 320 may provide network access to the UE 120-1 over a coverage area (e.g., a cell coverage area). The first UE 120-1 may include a Global Navigation Satellite System (GNSS) capability or a Global Positioning System (GPS) capability.

Example 310 shows a transparent satellite deployment, which may also be referred to as a bent-pipe satellite deployment. In the example 310, a second UE 120-2 is served by a satellite 340 via the service link 330-2, where the satellite 340 may be referred to as a transparent satellite. To illustrate, the satellite 340 may act as a relay by receiving a signal from gateway 350 via a feeder link 360, and relaying the signal to the UE 120-2 via the service link 330-2. Alternatively or additionally, the satellite 340 may receive an uplink radio frequency transmission from the UE 120-2 via the service link 330-2, and relay the uplink radio frequency transmission to the gateway 350 via the feeder link 360 without demodulating the uplink radio frequency transmission. In some aspects, the satellite 340 may perform a frequency conversion on the uplink radio frequency transmission from a first frequency (e.g., associated with the service link 330-2) to a second frequency (e.g., associated with the feeder link 360), and may amplify and/or filter the uplink radio frequency transmission. The satellite 340 may provide network access to the UE 120-2 while the UE 120-2 operates in a coverage area associated with the satellite 340. The second UE 120-2 may include a GNSS capability or a GPS capability.

As shown by the example 310, the satellite 340 and the UE 120-2 may communicate with one another based at least in part on the service link 330-2. The service link 330-2 may include an uplink for transmitting an uplink communication (e.g., from the UE 120-2 to the gateway 350 by way of the satellite 340) and/or a downlink for transmitting a downlink communication (e.g., from the gateway 350 to the UE 120-2 by way of the satellite 340). In a similar manner, the satellite 340 and the gateway 350 may communicate with one another based at least in part on the feeder link 360, where the feeder link 360 may include an uplink for transmitting an uplink communication and/or a downlink for transmitting a downlink communication.

The feeder link 360, the service link 330-1, and/or the service link 330-2 may each experience Doppler shift due to the movement of the satellites 320 and 340, and/or movement of the UE 120-1 or the UE 120-2. A Doppler shift associated with satellite movement may be significantly larger than a Doppler shift associated with a terrestrial network, based at least in part on a speed at which a satellite moves. In some aspects, a transmitting device may pre-compensate for a satellite-based Doppler shift. To illustrate, the feeder link 360 between the gateway 350 and the satellite 340 may be a 1:1 link between a single transmitting device and a single receiving device. Based at least in part on the feeder link 360 being a 1:1 link, the gateway 350 and/or another network node may estimate a feeder link Doppler shift and pre-compensate (e.g., modify the transmitted signal) to mitigate the Doppler shift observed by the satellite 340. The satellite 340, however, may communicate with multiple UEs at varying locations based at least in part on a 1:N link, where N is an integer that may be greater than 1. To illustrate, the satellite 340 may broadcast information that is received and processed by N UEs at varying locations. The varying locations of the receiving UEs may result in each UE observing a different service link Doppler shift. Accordingly, the satellite 340 may refrain from applying pre-compensation for a service link Doppler shift based at least in part on the 1:N link and the variation in the observed service link Doppler shift between each UE.

A satellite-based Doppler shift may be observed by a UE as a timing drift and/or a frequency drift. A timing drift, which may also be referred to as a clock drift, may denote a time deviation from an absolute or base time, while a frequency drift may denote a frequency deviation from an absolute or base frequency. A timing drift and/or a frequency drift based on the satellite-based Doppler shift may result in the UE failing to receive a downlink signal from the satellite 320 and/or the satellite 340. As one example, a satellite-based Doppler shift may cause a time tracking loop (TTL) at the UE to incorrectly estimate a timing drift and result in a time base at the UE being unsynchronized with a time base at a network node and cause recovery errors. In a similar manner, the satellite-based Doppler shift may cause a frequency tracking loop (FTL) at the UE to incorrectly estimate a frequency drift and result in the UE tuning a receiver to an incorrect frequency. The unsynchronized time base and/or an incorrectly tuned receiver may result in a lost communication and/or increased bit errors.

Some techniques and apparatuses described herein provide downlink loop operation in a non-terrestrial network. A UE may receive ephemeris information associated with a satellite and a timing advance (TA) parameter associated with the satellite. In some aspects, the TA parameter may be associated with a feeder link between the satellite and a network node. Based at least in part on the ephemeris information, the UE may modify at least one of a downlink FTL or a downlink TTL. Alternatively or additionally, the UE may modify the downlink TTL and/or the downlink FTL based at least in part on the TA parameter. In some aspects, the UE may receive a downlink signal from the satellite based at least in part on modifying the downlink FTL or the downlink TTL.

As one example, a UE may calculate a first Doppler shift associated with a service link between the satellite and UE based at least in part on the ephemeris information and a second Doppler shift associated with a feeder link between the satellite and a network node based at least in part on the TA parameter and/or the ephemeris information. The UE may then modify the downlink FTL or the downlink TTL based at least in part on the first Doppler shift or the second Doppler shift. By calculating a satellite-based Doppler shift (e.g., a first Doppler shift associated with the service link and/or a second Doppler shift associated with a feeder link), the UE may modify the TTL and/or FTL to mitigate timing errors and/or frequency errors that are based at least in part on the satellite-based Doppler shift. Mitigating the effects of a satellite-based Doppler shift may improve how a UE receives a downlink signal, reducing recovery errors and/or reducing lost communications between the UE, a satellite, and/or a network node.

As indicated above, FIG. 3 is provided as an example. Other examples may differ from what is described with regard to FIG. 3.

Figure 4:
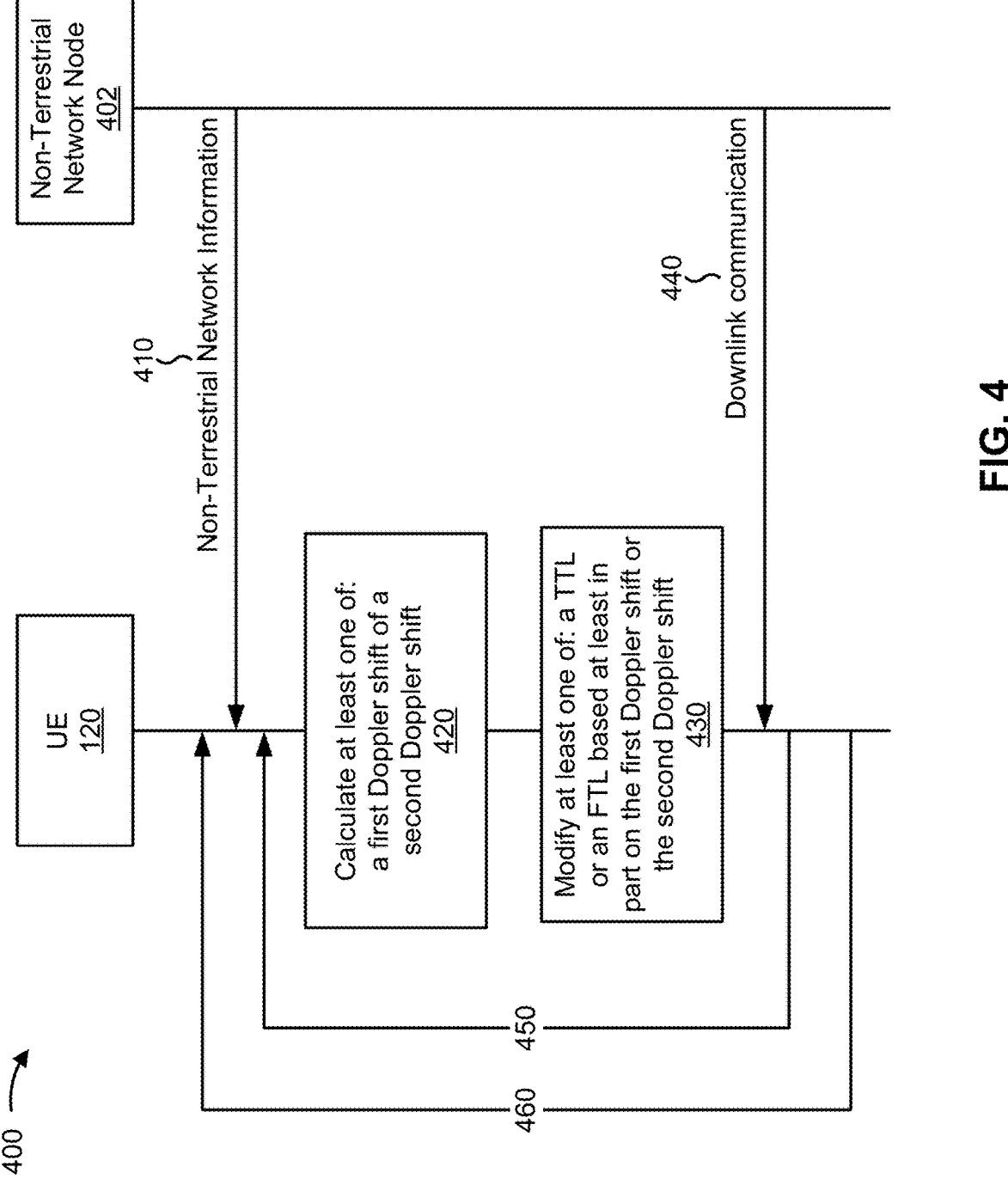
FIG. 4 is a diagram illustrating an example of a wireless communication process between a UE and a non-terrestrial network node in a wireless communication network, in accordance with the present disclosure.

FIG. 4 is a diagram illustrating an example 400 of a wireless communication process between a UE 120 and a non-terrestrial network node 402 (e.g., the non-terrestrial network node 110*b*) in a wireless communication network, in accordance with the present disclosure.

As shown by reference number 410, the non-terrestrial network node 402 may transmit, and the UE 120 may receive, non-terrestrial network information. As one example, the non-terrestrial network node 402 may transmit the non-terrestrial network information based at least in part on a system information block (SIB).

The non-terrestrial network information may include any combination of information associated with the non-terrestrial network and/or one or more devices operating in the non-terrestrial network. As one example, the non-terrestrial information may include ephemeris information associated with a satellite (e.g., timing information, a current location and/or position, a predicted location and/or predicted position, trajectory and/or orbit information, an epoch time, a satellite velocity vector, a satellite location vector, and/or a satellite identifier). In some aspects, the ephemeris information may be associated with a satellite serving the UE 120. In at least one example, the ephemeris information may be communicated by the non-terrestrial network node 402 based at least in part on a position, velocity, time (PVT) format. To illustrate, the PVT information may indicate Cartesian coordinates that are based on a common reference point (e.g., a center of the Earth), where the Cartesian coordinates characterize the movement of the serving satellite (e.g., position, velocity, and/or time information). Alternatively or additionally, the non-terrestrial information may include one or more parameters that characterize a feeder link between the satellite that services the UE 120 and a ground station, such as a TA parameter associated with the feeder link. The ephemeris information and/or a feeder link parameter (e.g., the TA parameter) may be based at least in part on an epoch time.

As shown by reference number 420, the UE 120 may calculate a first Doppler shift associated with a service link between the UE 120 and a serving satellite. Alternatively or additionally, the UE 120 may calculate a second Doppler shift associated with a feeder link between the serving satellite and a ground station. To illustrate, the UE 120 may calculate the service link Doppler shift based at least in part on the ephemeris information. Alternatively or additionally, the UE 120 may calculate the feeder link Doppler shift based at least in part on the TA parameter and/or the ephemeris information. In some aspects, the feeder link Doppler shift calculated by the UE 120 may be referred to as an equivalent feeder link Doppler shift, where the UE 120 may not observe the equivalent feeder link Doppler shift in a received signal based at least in part on pre-compensation applied at a network node (e.g., the gateway 350).

Ephemeris information that is based at least in part on a PVT format may indicate a satellite location vector at epoch time T, which may be represented as:

$$P_{Satellite}(T) \tag{1}$$

Alternatively or additionally, the ephemeris information may indicate a satellite velocity vector at epoch time T, which may be represented as:

$$V_{Satellite}(T) \tag{2}$$

Based at least in part on the satellite location vector, the UE 120 may compute a satellite acceleration vector at time t using the equation:

$$A_{Satellite}(t) = -g \frac{P_{Satellite}(t)}{\|P_{Satellite}(t)\|} \tag{3}$$

where g represents a gravitational acceleration associated with the satellite. The gravitational acceleration may be calculated based at least in part on an altitude of the satellite and a universal gravitational constant. The UE 120 may also compute a satellite location vector update for time t+Δt using the equation:

$$P_{Satellite}(t+\Delta t)=P_{Satellite}(t)*V_{Satellite}(t) \tag{4}$$

In some aspects, the UE 120 may compute a satellite velocity vector update for time t+Δt using the equation:

$$V_{Satellite}(t+\Delta t)=V_{Satellite}(t)+\Delta t*A_{Satellite}(t) \tag{5}$$

As further described below, the UE 120 may calculate the service link Doppler shift based at least in part on a satellite position and/or a satellite velocity using any combination of (1)-(5).

The UE 120 may alternatively or additionally calculate a UE position and/or a UE location to determine the service link Doppler shift. To illustrate, the UE may calculate the UE position and/or the UE location based at least in part on GNSS information. For example, the UE 120 may calculate a GNSS position fix associated with the UE based at least in part on acquiring one or more satellite signals (e.g., three satellite signals). A GNSS position fix may denote a location of a device that is derived directly from the acquisition of the one or more satellite signals at time t. In some aspects, the UE 120 may calculate a UE location vector based at least in part on the GNSS position fix determined at time t, which may be represented as:

$$P_{UE}(t) \tag{6}$$

Alternatively or additionally, the UE 120 may compute a UE velocity vector (e.g., based at least in part on the UE location vector at the GNSS position fix) using the equation:

$$V_{UE}(t) = \frac{P_{UE}(t) - P_{UE}(t-T)}{T} \tag{7}$$

where T represents the time gap between two successive GNSS fixes. Using the UE velocity vector, the UE 120 may compute a UE acceleration vector based at least in part on the equation:

$$A_{UE}(t) = \frac{V_{UE}(t) - V_{UE}(t-T)}{T} \tag{8}$$

The UE may update the UE location vector, the UE velocity vector, and/or the UE acceleration vector each time the UE calculates an updated GNSS position fix.

In some aspects, the UE 120 may calculate an updated GNSS position fix at a first periodic interval and one or more UE location vector updates at a second, shorter periodic interval (e.g., shorter than the first periodic interval). As one example, the UE 120 may calculate a UE location vector update using the equation:

$$P_{UE}(t+\Delta t)=P_{UE}(t)+\Delta t*V_{UE}(t) \tag{9}$$

Alternatively or additionally, the UE may calculate one or more UE velocity vector updates at the second, shorter periodic interval using the equation:

$$V_{UE}(t+\Delta t)=V_{UE}(t)+\Delta t*A_{UE}(t) \tag{10}$$

Accordingly, the UE 120 may calculate a GNSS position fix at a first, longer periodic interval and calculate a UE location vector update and/or a UE velocity vector update at a second, shorter periodic interval (e.g., between the GNSS position fix calculations) based at least in part on (6)-(10). Calculating the GNSS position fix at a longer time interval may reduce service interruptions and/or preserve resources of the UE 120 (e.g., computing resources) for other processes.

In some aspects, the UE 120 may calculate the service link Doppler shift based at least in part on the equation:

$$F_{ServiceLink}(t) = \frac{\langle P_{UE}(t) - P_{Satellite}(t), V_{UE}(t) - V_{Satellite}(t) \rangle}{c\|P_{UE}(t) - P_{Satellite}(t)\|} f_c \quad (11)$$

where c represents the speed of light and $f_c$ represents a carrier frequency. In some aspects, the UE 120 may periodically calculate the service link Doppler shift (e.g., every $\Delta t$ at the second, shorter periodic interval between GNSS position fix updates) and update the TTL and/or the FTL to mitigate timing and frequency errors.

In some aspects, the UE 120 may calculate the feeder link Doppler shift based at least in part on a propagation delay associated with the feeder link. As one example, the UE 120 may calculate the propagation delay associated with the feeder link based at least in part on one or more TA parameters, such as a common TA parameter that may be used by multiple devices. To illustrate, the UE 120 may receive and/or recover a TA parameter and an associated epoch time based at least in part on receiving an SIB. The UE 120 may use the TA parameter (e.g., a common TA parameter) to calculate one or more propagation delays using the equations:

$$D_{FeederLink}(T) = \frac{TA_{common}}{2} \quad (12)$$

$$D_{FeederLink-first\,drift}(T) = \frac{TA_{common} - \text{first drift}}{2} \quad (13)$$

$$D_{FeederLink-second\,drift}(T) = \frac{TA_{common} - \text{drift variation}}{2} \quad (14)$$

where T is the epoch time associated with the TA parameter, the first drift and the second drift each represent a time drift at respective times, and the drift variation may be calculated as:

$$\text{drift variation} = \text{second drift} - \text{first drift} \quad (15)$$

Based at least in part on the propagation delay definitions above, the UE 120 may calculate a downlink propagation delay associated with the feeder link based at least in part on the equation:

$$T_{FeederLink}(t) = D_{FeederLink}(T) + D_{FeederLink-first\,drift}(t-T) + D_{FeederLink-second\,drift}(t-T)^2 \quad (16)$$

The UE 120 may calculate the feeder link Doppler shift, based at least in part on the downlink propagation delay, at time t as:

$$F_{FeederLink}(t) = \frac{-T_{drift}(t)}{\Delta t} f_c \quad (17)$$

where $f_c$ represents a carrier frequency and $\Delta t$ is the time difference used in the drift calculation equation:

$$T_{drift}(t) = T_{FeederLink}(t) - T_{FeederLink}(t-\Delta t) \quad (18)$$

Similar to the service link Doppler shift, the UE 120 may calculate the feeder link Doppler shift at the second, shorter periodic interval between common TA parameter update by the non-terrestrial network.

As shown by reference number 430, the UE 120 may modify a downlink TTL and/or a downlink FTL based at least in part on the service link Doppler shift and/or the feeder link Doppler shift. In some aspects, the UE 120 may modify the downlink TTL and/or the downlink FTL based at least in part on a feeder link parameter (e.g., a TA parameter). To illustrate, a downlink FTL may calculate a frequency error and apply a frequency correction at a receiver front end to mitigate a frequency error as further described with regard to FIG. 5. Applying the frequency correction may improve reception of a signal and, subsequently, improve recovery of information (e.g., by reducing bit errors and/or improving data throughput). However, calculating the frequency error without considering an effect due to service link Doppler shift drift may result in an erroneous correction at the receiver front end that results in increased bit error, reduced data throughput, and/or missed communications.

Based at least in part on equation (11) described above, the UE 120 may calculate a service link Doppler shift drift based at least in part on the equation:

$$F_{ServiceLink\,Drift}(t+\Delta t) = F_{ServiceLink}(t+\Delta t) - F_{ServiceLink}(t) \quad (19)$$

The UE 120 may remove the calculated service link Doppler shift from a measured FTL error. As one example, the UE 120 may generate the measured FTL error based at least in part on measuring a reference signal, such as a tracking reference signal and/or a synchronization signal block. The UE 120 may calculate a frequency correction that removes effects associated with the service link Doppler shift drift, based at least in part on the equation:

$$F_{error} = F_{FTL\,measured\,error} - F_{ServiceLink\,Drift} \quad (20)$$

Figure 5:
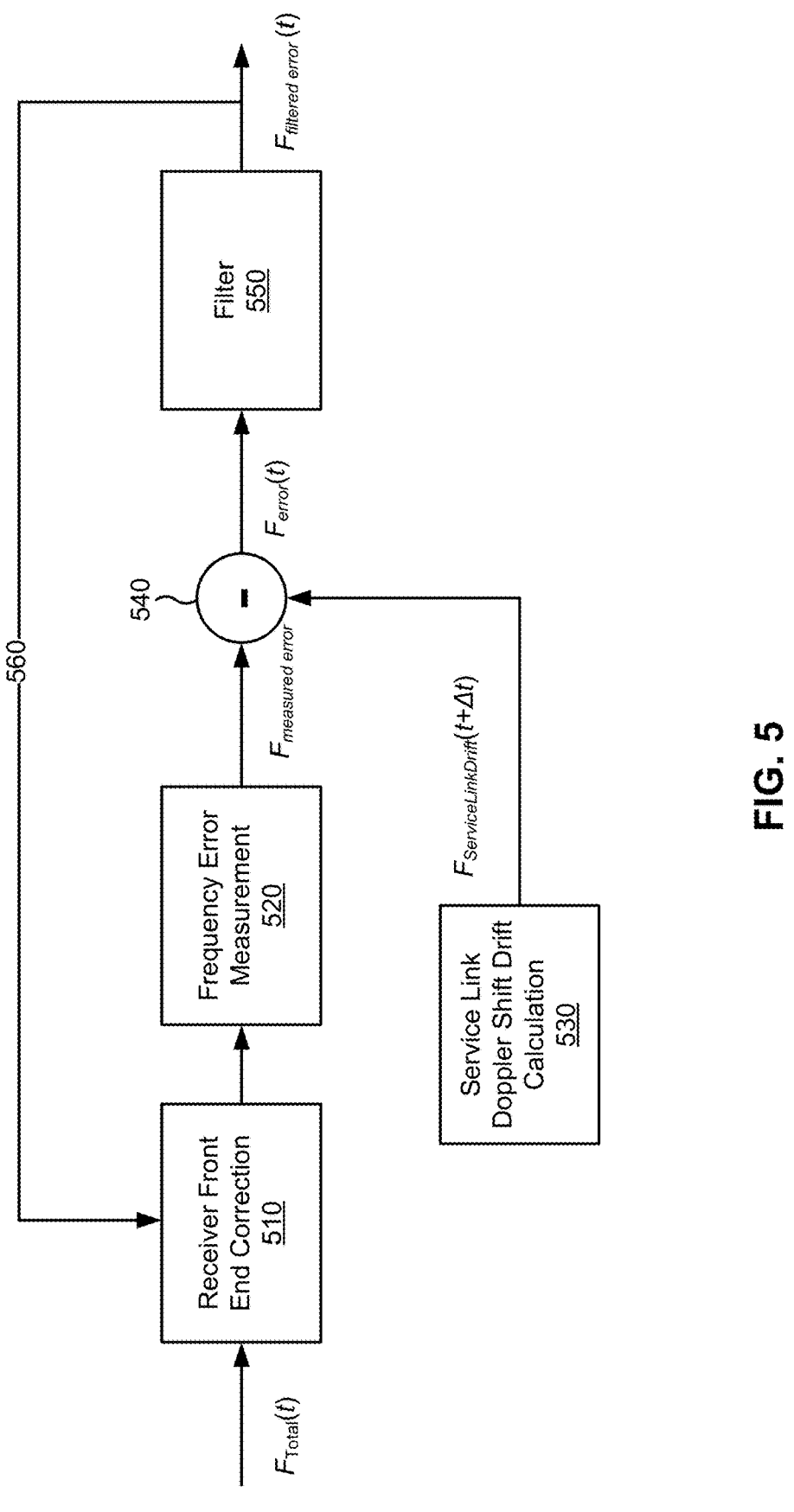
FIG. 5 is a diagram illustrating an example of a frequency tracking loop block diagram, in accordance with the present disclosure.

To further illustrate, a total frequency error (as further shown with regard to FIG. 5), may be defined as:

$$F_{Total}(t+\Delta t) = F_{Total}(t) + F_{ServiceLink\,Drift}(t+\Delta) \\ F_{error\,filtered}(t) \quad (21)$$

where $F_{Total}(t)$ represents a total frequency error input and/or observed at an input of the downlink FTL loop and $F_{error\,filtered}(t)$ represents a filtered version of $F_{error}(t)$ as shown with regard to FIG. 5.

In some aspects, the UE 120 may modify the downlink TTL based at least in part on determining a sampling rate correction value, such as a variable sampling rate conversion (VSRC) correction value. To illustrate, the UE 120 may calculate a sampling rate correction value that is based at least in part on aligning an analog-to-digital (ADC) converter at the UE's receiver with a digital-to-analog (DAC) converter at a transmitting device. As one example, the UE 120 may determine the sampling rate correction value based at least in part on the service link Doppler shift and/or the feeder link Doppler shift. The UE 120 may determine an initial sampling rate correction value based at least in part on the equation:

$$F_{VSRC}(t) = F_{Total}(t) + F_{Feeder\,Link}(t) \quad (22)$$

Alternatively or additionally, the UE 120 may calculate an update to the sampling rate correction value based at least in part on the equation:

$$F_{VSRC}(t+\Delta t) = F_{Total}(t+\Delta t) + F_{Feeder\,Link}(t+\Delta t) \quad (23)$$

In some aspects, the UE 120 may update the feeder link Doppler shift based at least in part on receiving an updated common TA parameter. To illustrate, the UE 120 may calculate an updated feeder link propagation delay based at least in part on any combination of (12)-(18) described above. In some aspects, the UE 120 may update a system timer based at least in part on calculating the sampling rate correction value, such as by applying a correction value to a system timer associated with the ADC converter. As shown by reference number 440, the non-terrestrial network node 402 may transmit, and the UE 120 may receive, a downlink communication. In some aspects, the UE 120 may receive the downlink communication based at least in part on modifying the TTL and/or the FTL as described with regard to the reference number 430.

As shown by reference number 450 and by reference number 460, the UE 120 and/or the non-terrestrial network node 402 may iteratively perform one or more signaling transactions and/or actions shown by the example 400. To illustrate, and as shown by the reference number 450, the UE 120 may iteratively calculate an updated service link Doppler shift and/or an updated feeder link Doppler shift. As one example, the UE 120 may iteratively calculate an updated satellite position and/or an updated satellite velocity at the second, shorter periodic interval (e.g., based at least in part on at least one of the satellite location vector, the satellite velocity vector, the satellite acceleration vector, the satellite location vector update, or the satellite velocity vector update). The UE 120 may subsequently recalculate the service link Doppler shift based at least in part on the updated satellite position and/or the updated satellite velocity. In some aspects, the UE 120 may iteratively calculate the feeder link Doppler shift at a periodic interval (e.g., the second, shorter periodic interval).

Alternatively or additionally, the UE 120 may iteratively calculate an updated service link Doppler shift based at least in part on calculating an updated UE position and/or an updated UE velocity. As one example, the UE 120 may calculate an updated GNSS position fix at the first periodic interval and calculate an updated UE position and/or an updated UE velocity (e.g., at the same interval and/or at the second, shorter periodic interval) based at least in part on the updated GNSS position fix. The UE 120 may then modify the downlink FTL and/or the downlink TTL based at least in part on the updated service link Doppler shift and/or the updated feeder link Doppler shift.

In some aspects, and as shown by the reference number 460, the UE 120 may receive updated ephemeris information that indicates any combination of an updated satellite location vector, an updated satellite velocity vector, and/or an updated common TA parameter. Based at least in part on the updated ephemeris information, the UE 120 may calculate an updated satellite acceleration vector, an additional satellite location vector update, and/or an additional satellite velocity vector update. The UE 120 may subsequently recalculate the service link Doppler shift based at least in part on the updated satellite location vector, the updated satellite velocity vector, the updated satellite acceleration vector, the additional satellite location vector update, and/or the additional satellite velocity vector update. In some aspects, the UE 120 may modify the downlink FTL and/or the downlink TTL based at least in part on the recalculated service link Doppler shift. Alternatively or additionally, the UE 120 may recalculate the feeder link Doppler shift based at least in part on receiving an updated common TA parameter and/or updated epoch time and modify the downlink FTL and/or the downlink TTL based at least in part on the recalculated feeder link Doppler shift.

By calculating a satellite-based Doppler shift (e.g., a first Doppler shift associated with the service link and/or a second Doppler shift associated with a feeder link), the UE may modify the TTL and/or FTL to mitigate timing errors and/or frequency errors that are based at least in part on the satellite-based Doppler shift. Mitigating the effects of a satellite-based Doppler shift may improve how a UE receives a downlink signal by reducing recovery errors and/or reducing lost communications between the UE, a satellite, and/or a network node.

As indicated above, FIG. 4 is provided as an example. Other examples may differ from what is described with regard to FIG. 4.

FIG. 5 is a diagram illustrating an example 500 of an FTL block diagram, in accordance with the present disclosure. In some aspects, a UE (e.g., the UE 120 or an apparatus 700) may implement aspects of the FTL using any combination of software, firmware, and/or hardware.

In some aspects, a receiving device, such as the UE 120, may estimate an observed frequency error and apply a correction to a front end receiver to improve the alignment between a demodulation carrier frequency as observed at the receiving device and a carrier frequency as originated by a transmitting device (e.g., the non-terrestrial network node 402). The estimation of the total observed frequency error may represented as $F_{Total}(t)$. The total observed frequency error may include a first frequency error associated with a clock drift and/or local oscillator drift at the receiver and a second frequency error associated with a Doppler shift (e.g., the service link Doppler shift). In some aspects, the receiver front end correction module 510 may apply a frequency correction to receiver hardware such that the receiver hardware outputs a modified signal.

A frequency error measurement module 520 may calculate a frequency error measurement (shown by the example 500 as $F_{measured\ error}$) based at least in part on the modified signal generated by the (corrected) receiver hardware. To illustrate, the frequency error measurement module 520 may calculate a difference between an expected frequency of a reference signal and a measured frequency of a received reference signal. In some aspects, the frequency error measurement module 520 may calculate the frequency error measurement at a periodic interval (e.g., 20 milliseconds) associated with a transmission of the reference signal.

As shown by the example 500, the FTL may remove, from the frequency error measurement, an observed frequency error associated with a service link Doppler shift drift. "Doppler shift drift" may denote a change in an observed Doppler shift over a time duration (e.g., $\Delta t$) based at least in part on a change in movement and/or position of a transmitting device and/or a receiving device. In some aspects, a service link Doppler shift drift calculation module 530 may calculate a service link Doppler shift drift based at least in part on the equation (19) as described above, and remove the observed change from the measured frequency error. For example, the FTL may include a subtraction module 540 that removes the service link Doppler shift drift from the frequency error measurement. A corrected frequency error that has service link Doppler shift drift removed may be represented as $F_{error}(t)$.

In some aspects, the FTL may include a filter module 550 that receives the frequency error as input, and generates a filtered frequency error value (shown as $F_{filtered\ error}(t)$ by the example 500). To illustrate, a filter module 550 may remove a fluctuation in the frequency error that is based at least in part on noise. As shown by reference number 560, the FTL may apply a correction to the receiver hardware based at least in part on the filtered frequency error.

As indicated above, FIG. 5 is provided as an example. Other examples may differ from what is described with regard to FIG. 5.

FIG. 6 is a diagram illustrating an example process 600 performed, for example, by a UE, in accordance with the present disclosure. Example process 600 is an example where the UE (e.g., the UE 120) performs operations associated with downlink loop operation in a non-terrestrial network.

As shown in FIG. 6, in some aspects, process 600 may include receiving ephemeris information associated with a satellite and a timing advance parameter associated with the satellite (block 610). For example, the UE (e.g., using communication manager 140 and/or reception component 702, depicted in FIG. 7) may receive ephemeris information associated with a satellite and a timing advance parameter associated with the satellite, as described above.

As further shown in FIG. 6, in some aspects, process 600 may include modifying, based at least in part on the ephemeris information, at least one of: a downlink FTL, or a downlink TTL (block 620). For example, the UE (e.g., using communication manager 140 and/or loop modification component 708, depicted in FIG. 7) may modify, based at least in part on the ephemeris information, at least one of: a downlink FTL, or a downlink TTL, as described above.

As further shown in FIG. 6, in some aspects, process 600 may include receiving a downlink signal from the satellite based at least in part on modifying the downlink FTL or the downlink TTL (block 630). For example, the UE (e.g., using communication manager 140 and/or reception component 702, depicted in FIG. 7) may receive a downlink signal from the satellite based at least in part on modifying the downlink FTL or the downlink TTL, as described above. By modifying the TTL and/or FTL based at least in part on the satellite-based Doppler shift, the UE may mitigate the effects of the satellite-based Doppler shift and improve how the UE receives a downlink signal. For example, the modifications to the TTL and/or FTL may reduce recovery errors and/or reduce lost communications between the UE, a satellite, and/or a network node.

Process 600 may include additional aspects, such as any single aspect or any combination of aspects described below and/or in connection with one or more other processes described elsewhere herein.

In a first aspect, process 600 includes calculating a first Doppler shift associated with a service link between the satellite and UE based at least in part on the ephemeris information and a second Doppler shift associated with a feeder link between the satellite and a network entity based at least in part on the timing advance parameter. In some aspects, modifying at least one of the downlink FTL or the downlink TTL may include modifying at least one of the downlink FTL or the downlink TTL based at least in part on the first Doppler shift or the second Doppler shift.

In a second aspect, alone or in combination with the first aspect, calculating the first Doppler shift may include calculating the first Doppler shift based at least in part on GNSS information associated with the UE.

In a third aspect, alone or in combination with one or more of the first and second aspects, process 600 includes calculating a UE position and a UE velocity based at least in part on at least one of a UE location vector that is based at least in part on a GNSS position fix associated with the UE, a UE velocity vector that is based at least in part on the GNSS position fix associated with the UE, a UE acceleration vector that is based at least in part on the UE velocity vector, a UE location vector update, or a UE velocity vector update. In some aspects, calculating the first Doppler shift may be based at least in part on the UE position and the UE velocity.

In a fourth aspect, alone or in combination with one or more of the first through third aspects, process 600 includes calculating an updated GNSS position fix at a first periodic interval, and calculating an updated UE position and an updated UE velocity at a second periodic interval, where the first periodic interval is longer than the second periodic interval.

In a fifth aspect, alone or in combination with one or more of the first through fourth aspects, process 600 includes calculating an updated first Doppler shift based at least in part on the updated UE position and the updated UE velocity, and modifying the at least one of the downlink FTL or the downlink TTL based at least in part on the updated first Doppler shift. Calculating updated Doppler shift information may improve the corrections applied to the downlink FTL and/or the downlink TTL and, subsequently, improve receiving and/or recovering downlink communications.

In a sixth aspect, alone or in combination with one or more of the first through fifth aspects, calculating the first Doppler shift includes calculating the first Doppler shift based at least in part on a satellite position associated with the satellite and a satellite velocity associated with the satellite.

In a seventh aspect, alone or in combination with one or more of the first through sixth aspects, the ephemeris information is based at least in part on a PVT format and an epoch time, and process 600 includes calculating, based at least in part on the PVT format of the ephemeris information, the satellite position and the satellite velocity based at least in part on at least one of a satellite location vector indicated by the ephemeris information, a satellite velocity vector indicated by the ephemeris information, a satellite acceleration vector associated with the satellite, a satellite location vector update associated with the satellite location vector, or a satellite velocity vector update associated with the satellite velocity vector.

In an eighth aspect, alone or in combination with one or more of the first through seventh aspects, process 600 includes calculating the satellite position and the satellite velocity at a periodic interval based at least in part on at least one of the satellite location vector, the satellite velocity vector, the satellite acceleration vector, the satellite location vector update, or the satellite velocity vector update.

In a ninth aspect, alone or in combination with one or more of the first through eighth aspects, process 600 includes receiving updated ephemeris information that indicates at least one of an updated satellite location vector, or an updated satellite velocity vector; calculating, based at least in part on the updated ephemeris information, at least one of an updated satellite acceleration vector, an additional satellite location vector update, or an additional satellite velocity vector update; recalculating the first Doppler shift based at least in part on at least one of the updated satellite location vector, the updated satellite velocity vector, the updated satellite acceleration vector, the additional satellite location vector update, or the additional satellite velocity vector update; and modifying the at least one of the downlink FTL or the downlink TTL based at least in part on the recalculated first Doppler shift.

In a tenth aspect, alone or in combination with one or more of the first through ninth aspects, calculating the second Doppler shift includes calculating the second Doppler shift based at least in part on the timing advance parameter and an epoch time.

In an eleventh aspect, alone or in combination with one or more of the first through tenth aspects, process 600 includes receiving the timing advance parameter and the epoch time based at least in part on an SIB.

In a twelfth aspect, alone or in combination with one or more of the first through eleventh aspects, calculating the second Doppler shift based at least in part on the timing advance parameter further includes calculating a propagation delay associated with the feeder link based at least in part on the timing advance parameter, and calculating the second Doppler shift based at least in part on the propagation delay.

In a thirteenth aspect, alone or in combination with one or more of the first through twelfth aspects, process 600 includes recalculating the second Doppler shift based at least in part on a periodic interval, and modifying the at least one of the downlink FTL or the downlink TTL based at least in part on the recalculated second Doppler shift.

In a fourteenth aspect, alone or in combination with one or more of the first through thirteenth aspects, process 600 includes calculating a frequency correction associated with the downlink FTL based at least in part on the first Doppler shift, and modifying the downlink FTL based at least in part on the frequency correction.

In a fifteenth aspect, alone or in combination with one or more of the first through fourteenth aspects, process 600 includes calculating, based at least in part on a reference signal, a frequency error associated with the downlink signal. In some aspects, calculating the frequency correction includes calculating the frequency correction based at least in part on removing the first Doppler shift from the frequency error.

In a sixteenth aspect, alone or in combination with one or more of the first through fifteenth aspects, the reference signal includes a tracking reference signal or a synchronization signal block.

In a seventeenth aspect, alone or in combination with one or more of the first through sixteenth aspects, process 600 includes determining a sampling rate correction value based at least in part on the first Doppler shift and the second Doppler shift, and updating a system timer based at least in part on the sampling rate correction value.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
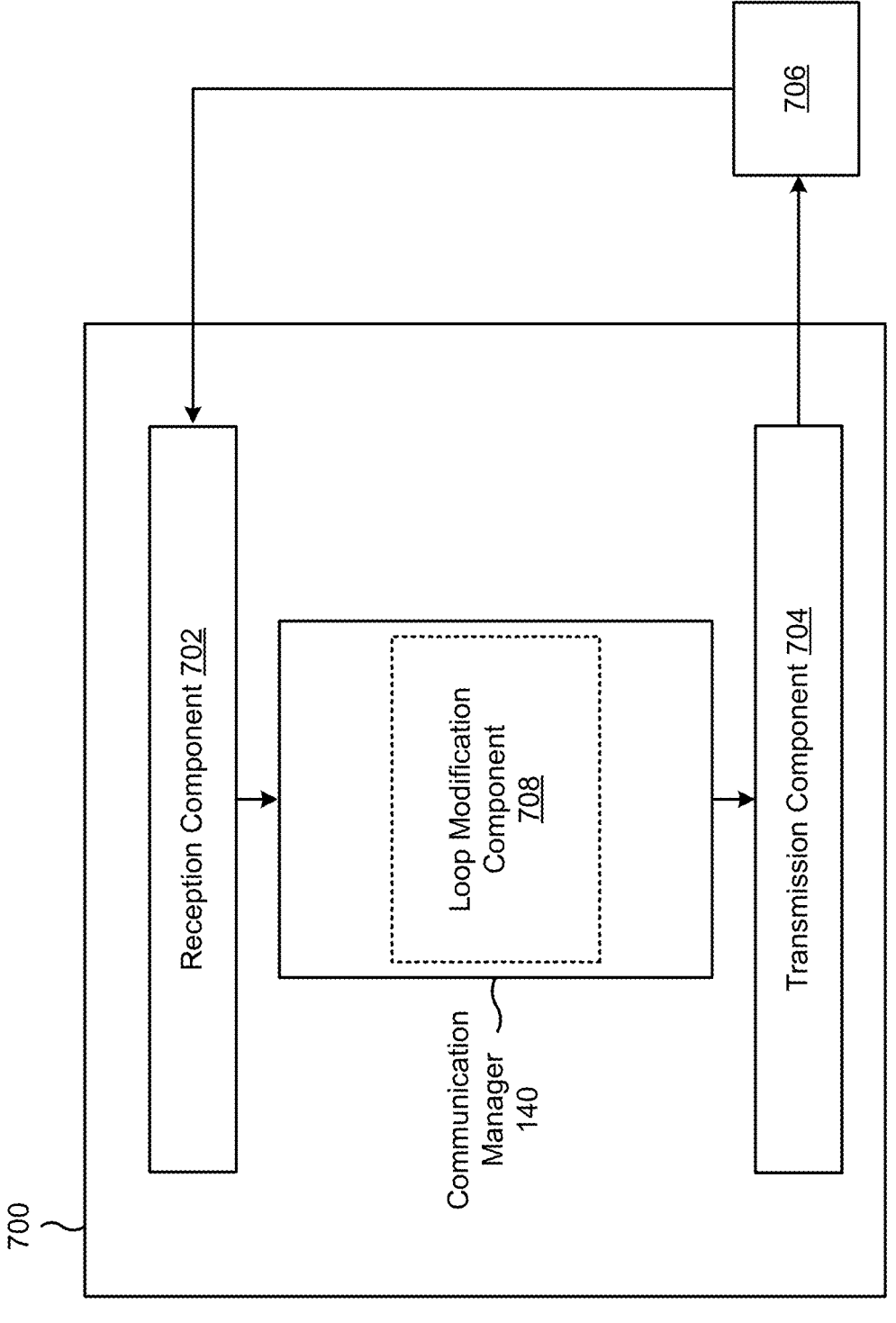
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a loop modification component 708, among other examples.

In some aspects, the apparatus 700 may be configured to perform one or more operations described herein in connection with FIGS. 4 and 5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive ephemeris information associated with a satellite and a timing advance parameter associated with the satellite. The loop modification component 708 may modify, based at least in part on the ephemeris information, at least one of a downlink FTL or a downlink TTL. The reception component 702 may receive a downlink signal from the satellite based at least in part on modifying the downlink FTL or the downlink TTL.

The loop modification component 708 may calculate a first Doppler shift associated with a service link between the satellite and the UE based at least in part on the ephemeris information and a second Doppler shift associated with a feeder link between the satellite and a network entity based at least in part on the timing advance parameter. In some aspects, the loop modification component 708 may modify at least one of the downlink FTL or the downlink TTL based at least in part on the first Doppler shift or the second Doppler shift.

The loop modification component 708 may calculate a UE position and a UE velocity based at least in part on at least one of a UE location vector that is based at least in part on a GNSS position fix associated with the UE, a UE velocity vector that is based at least in part on the GNSS position fix associated with the UE, a UE acceleration vector that is based at least in part on the UE velocity vector, a UE location vector update, or a UE velocity vector update. In some aspects, the loop modification component 708 may calculate the first Doppler shift based at least in part on the UE position and the UE velocity.

The loop modification component 708 may calculate an updated GNSS position fix at a first periodic interval. Alternatively or additionally, the loop modification component 708 may calculate an updated UE position and an updated UE velocity at a second periodic interval, where the first periodic interval is longer than the second periodic interval. In some aspects, the loop modification component 708 may calculate an updated first Doppler shift based at least in part on the updated UE position and the updated UE velocity. The loop modification component 708 may modify the at least one of the downlink FTL or the downlink TTL based at least in part on the updated first Doppler shift.

The loop modification component 708 may calculate the satellite position and the satellite velocity at a periodic interval based at least in part on at least one of the satellite location vector, the satellite velocity vector, the satellite acceleration vector, the satellite location vector update, or the satellite velocity vector update.

The reception component 702 may receive updated ephemeris information that indicates at least one of an updated satellite location vector, or an updated satellite velocity vector.

The loop modification component 708 may calculate, based at least in part on the updated ephemeris information, at least one of an updated satellite acceleration vector, an additional satellite location vector update, or an additional satellite velocity vector update. In some aspects, the loop modification component 708 may recalculate the first Doppler shift based at least in part on at least one of the updated satellite location vector, the updated satellite velocity vector, the updated satellite acceleration vector, the additional satellite location vector update, or the additional satellite velocity vector update. The loop modification component 708 may modify the at least one of the downlink FTL or the downlink TTL based at least in part on the recalculated first Doppler shift.

The reception component 702 may receive the timing advance parameter and the epoch time based at least in part on an SIB.

The loop modification component 708 may recalculate the second Doppler shift based at least in part on a periodic interval. In some aspects, the loop modification component 708 may modify the at least one of the downlink FTL or the downlink TTL based at least in part on the recalculated second Doppler shift.

The loop modification component 708 may calculate a frequency correction associated with the downlink FTL based at least in part on the first Doppler shift. In some aspects, the loop modification component 708 may modify the downlink FTL based at least in part on the frequency correction.

The loop modification component 708 may calculate, based at least in part on a reference signal, a frequency error associated with the downlink signal, and calculating the frequency correction may include removing the first Doppler shift from the frequency error.

The loop modification component 708 may determine a sampling rate correction value based at least in part on the first Doppler shift and the second Doppler shift. In some aspects, the loop modification component 708 may update a system timer based at least in part on the sampling rate correction value.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving ephemeris information associated with a satellite and a timing advance parameter associated with the satellite; modifying, based at least in part on the ephemeris information, at least one of: a downlink frequency tracking loop (FTL), or a downlink time tracking loop (TTL); and receiving a downlink signal from the satellite based at least in part on modifying the downlink FTL or the downlink TTL.

Aspect 2: The method of Aspect 1, further comprising: calculating a first Doppler shift associated with a service link between the satellite and UE based at least in part on the ephemeris information and a second Doppler shift associated with a feeder link between the satellite and a network entity based at least in part on the timing advance parameter, wherein modifying at least one of the downlink FTL or the downlink TTL further comprises: modifying at least one of the downlink FTL or the downlink TTL based at least in part on the first Doppler shift or the second Doppler shift.

Aspect 3: The method of Aspect 2, wherein calculating the first Doppler shift comprises: calculating the first Doppler shift based at least in part on global navigation satellite system (GNSS) information associated with the UE.

Aspect 4: The method of Aspect 3, further comprising: calculating a UE position and a UE velocity based at least in part on at least one of: a UE location vector that is based at least in part on a GNSS position fix associated with the UE, a UE velocity vector that is based at least in part on the GNSS position fix associated with the UE, a UE acceleration vector that is based at least in part on the UE velocity vector, a UE location vector update, or a UE velocity vector update, wherein calculating the first Doppler shift is based at least in part on the UE position and the UE velocity.

Aspect 5: The method of Aspect 4, further comprising: calculating an updated GNSS position fix at a first periodic interval; and calculating an updated UE position and an updated UE velocity at a second periodic interval, wherein the first periodic interval is longer than the second periodic interval.

Aspect 6: The method of Aspect 5, further comprising: calculating an updated first Doppler shift based at least in part on the updated UE position and the updated UE velocity; and modifying the at least one of the downlink FTL or the downlink TTL based at least in part on the updated first Doppler shift.

Aspect 7: The method of any one of Aspects 2-6, wherein calculating the first Doppler shift comprises: calculating the first Doppler shift based at least in part on a satellite position associated with the satellite and a satellite velocity associated with the satellite.

Aspect 8: The method of Aspect 7, wherein the ephemeris information is based at least in part on a position, velocity, time (PVT) format and an epoch time, and the method further comprises: calculating, based at least in part on the PVT format of the ephemeris information, the satellite position and the satellite velocity based at least in part on at least one of: a satellite location vector indicated by the ephemeris information, a satellite velocity vector indicated by the ephemeris information, a satellite acceleration vector associated with the satellite, a satellite location vector update associated with the satellite location vector, or a satellite velocity vector update associated with the satellite velocity vector.

Aspect 9: The method of Aspect 8, further comprising: calculating the satellite position and the satellite velocity at a periodic interval based at least in part on at least one of the satellite location vector, the satellite velocity vector, the satellite acceleration vector, the satellite location vector update, or the satellite velocity vector update.

Aspect 10: The method of Aspect 8, further comprising: receiving updated ephemeris information that indicates at least one of: an updated satellite location vector, or an updated satellite velocity vector; calculating, based at least in part on the updated ephemeris information, at least one of: an updated satellite acceleration vector, an additional satellite location vector update, or an additional satellite velocity vector update; recalculating the first Doppler shift based at least in part on at least one of the updated satellite location vector, the updated satellite velocity vector, the updated satellite acceleration vector, the additional satellite location vector update, or the additional satellite velocity vector update; and modifying the at least one of the downlink FTL or the downlink TTL based at least in part on the recalculated first Doppler shift.

Aspect 11: The method of any one of Aspects 2-10, wherein calculating the second Doppler shift comprises: calculating the second Doppler shift based at least in part on the timing advance parameter and an epoch time.

Aspect 12: The method of Aspect 11, further comprising: receiving the timing advance parameter and the epoch time based at least in part on a system information block (SIB).

Aspect 13: The method of Aspect 11 or Aspect 12, wherein calculating the second Doppler shift based at least in part on the timing advance parameter further comprises: calculating a propagation delay associated with the feeder link based at least in part on the timing advance parameter; and calculating the second Doppler shift based at least in part on the propagation delay.

Aspect 14: The method of any one of Aspects 11-13, further comprising: recalculating the second Doppler shift based at least in part on a periodic interval; and modifying the at least one of the downlink FTL or the downlink TTL based at least in part on the recalculated second Doppler shift.

Aspect 15: The method of any one of Aspects 2-15, further comprising: calculating a frequency correction associated with the downlink FTL based at least in part on the first Doppler shift; and modifying the downlink FTL based at least in part on the frequency correction.

Aspect 16: The method of Aspect 15, further comprising: calculating, based at least in part on a reference signal, a frequency error associated with the downlink signal, wherein calculating the frequency correction further comprises: calculating the frequency correction based at least in part on removing the first Doppler shift from the frequency error.

Aspect 17: The method of Aspect 16, wherein the reference signal comprises a tracking reference signal or a synchronization signal block.

Aspect 18: The method of Aspect 16 or Aspect 17, further comprising: determining a sampling rate correction value based at least in part on the first Doppler shift and the second Doppler shift; and updating a system timer based at least in part on the sampling rate correction value.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
  one or more memories; and
  one or more processors, coupled to the one or more memories, configured to:
    receive ephemeris information associated with a satellite and a timing advance parameter associated with the satellite;
    modify, based at least in part on the ephemeris information, at least one of:
      a downlink frequency tracking loop (FTL), or
      a downlink time tracking loop (TTL);
    receive a downlink signal from the satellite based at least in part on modifying the downlink FTL or the downlink TTL;
    calculate a first Doppler shift associated with a service link between the satellite and the UE based at least in part on the ephemeris information;
    receive updated ephemeris information that indicates at least one of:
      an updated satellite location vector, or
      an updated satellite velocity vector;
    calculate, based at least in part on the updated ephemeris information, at least one of:
      an updated satellite acceleration vector,
      an additional satellite location vector update, or
      an additional satellite velocity vector update;

recalculate the first Doppler shift based at least in part on at least one of the updated satellite location vector, the updated satellite velocity vector, the updated satellite acceleration vector, the additional satellite location vector update, or the additional satellite velocity vector update; and
    modify the at least one of the downlink FTL or the downlink TTL based at least in part on the recalculated first Doppler shift.

2. The apparatus of claim 1, wherein the one or more processors are further configured to:
  calculate a second Doppler shift associated with a feeder link between the satellite and a network entity based at least in part on the timing advance parameter,
  wherein the one or more processors, to modify, based at least in part on the ephemeris information, at least one of the downlink FTL or the downlink TTL, are configured to:
  modify at least one of the downlink FTL or the downlink TTL based at least in part on the first Doppler shift or the second Doppler shift.

3. The apparatus of claim 2, wherein the one or more processors, to calculate the first Doppler shift, are configured to:
  calculate the first Doppler shift based at least in part on global navigation satellite system (GNSS) information associated with the UE.

4. The apparatus of claim 3, wherein the one or more processors are further configured to:
  calculate a UE position and a UE velocity based at least in part on at least one of:
    a UE location vector that is based at least in part on a GNSS position fix associated with the UE,
    a UE velocity vector that is based at least in part on the GNSS position fix associated with the UE,
    a UE acceleration vector that is based at least in part on the UE velocity vector,
    a UE location vector update, or
    a UE velocity vector update,
  wherein the one or more processors are further configured to calculate the first Doppler shift based at least in part on the UE position and the UE velocity.

5. The apparatus of claim 4, wherein the one or more processors are further configured to:
  calculate an updated GNSS position fix at a first periodic interval; and
  calculate an updated UE position and an updated UE velocity at a second periodic interval,
    wherein the first periodic interval is longer than the second periodic interval.

6. The apparatus of claim 5, wherein the one or more processors are further configured to:
  calculate an updated first Doppler shift based at least in part on the updated UE position and the updated UE velocity; and
  modify the at least one of the downlink FTL or the downlink TTL based at least in part on the updated first Doppler shift.

7. The apparatus of claim 2, wherein the one or more processors, to calculate the first Doppler shift, are configured to:
  calculate the first Doppler shift based at least in part on a satellite position associated with the satellite and a satellite velocity associated with the satellite.

8. The apparatus of claim 7, wherein the one or more processors are further configured to:

calculate, based at least in part on the ephemeris information, the satellite position and the satellite velocity based at least in part on at least one of:

a satellite location vector indicated by the ephemeris information, a satellite velocity vector indicated by the ephemeris information, a satellite acceleration vector associated with the satellite, a satellite location vector update associated with the satellite location vector, or a satellite velocity vector update associated with the satellite velocity vector.

9. The apparatus of claim 8, wherein the one or more processors are further configured to:

calculate the satellite position and the satellite velocity at a periodic interval based at least in part on at least one of the satellite location vector, the satellite velocity vector, the satellite acceleration vector, the satellite location vector update, or the satellite velocity vector update.

10. The apparatus of claim 2, wherein the one or more processors, to calculate the second Doppler shift, are configured to:

calculate the second Doppler shift based at least in part on the timing advance parameter and an epoch time.

11. The apparatus of claim 10, wherein the one or more processors are further configured to:

receive the timing advance parameter and the epoch time based at least in part on a system information block (SIB).

12. The apparatus of claim 10, wherein the one or more processors, to calculate the second Doppler shift based at least in part on the timing advance parameter, are configured to:

calculate a propagation delay associated with the feeder link based at least in part on the timing advance parameter; and calculate the second Doppler shift based at least in part on the propagation delay.

13. The apparatus of claim 10, wherein the one or more processors are further configured to:

recalculate the second Doppler shift based at least in part on a periodic interval; and modify the at least one of the downlink FTL or the downlink TTL based at least in part on the recalculated second Doppler shift.

14. The apparatus of claim 2, wherein the one or more processors are further configured to:

calculate a frequency correction associated with the downlink FTL based at least in part on the first Doppler shift; and modify the downlink FTL based at least in part on the frequency correction.

15. The apparatus of claim 14, wherein the one or more processors are further configured to:

calculate, based at least in part on a reference signal, a frequency error associated with the downlink signal, wherein the one or more processors, to calculate the frequency correction, are configured to:

calculate the frequency correction based at least in part on removing the first Doppler shift from the frequency error.

16. The apparatus of claim 15, wherein the one or more processors are further configured to:

determine a sampling rate correction value based at least in part on the first Doppler shift and the second Doppler shift; and update a system timer based at least in part on the sampling rate correction value.

17. A method of wireless communication performed by a user equipment (UE), comprising:

receiving ephemeris information associated with a satellite and a timing advance parameter associated with the satellite;

modifying, based at least in part on the ephemeris information, at least one of:

a downlink frequency tracking loop (FTL), or a downlink time tracking loop (TTL);

receiving a downlink signal from the satellite based at least in part on modifying the downlink FTL or the downlink TTL;

calculating a first Doppler shift associated with a service link between the satellite and the UE based at least in part on the ephemeris information;

receiving updated ephemeris information that indicates at least one of:

an updated satellite location vector, or an updated satellite velocity vector;

calculating, based at least in part on the updated ephemeris information, at least one of:

an updated satellite acceleration vector, an additional satellite location vector update, or an additional satellite velocity vector update;

recalculating the first Doppler shift based at least in part on at least one of the updated satellite location vector, the updated satellite velocity vector, the updated satellite acceleration vector, the additional satellite location vector update, or the additional satellite velocity vector update; and modifying the at least one of the downlink FTL or the downlink TTL based at least in part on the recalculated first Doppler shift.

18. The method of claim 17, further comprising:

calculating a second Doppler shift associated with a feeder link between the satellite and a network entity based at least in part on the timing advance parameter, wherein modifying, based at least in part on the ephemeris information, at least one of the downlink FTL or the downlink TTL further comprises:

modifying at least one of the downlink FTL or the downlink TTL based at least in part on the first Doppler shift or the second Doppler shift.

19. The method of claim 18, wherein calculating the first Doppler shift comprises:

calculating the first Doppler shift based at least in part on global navigation satellite system (GNSS) information associated with the UE.

20. The method of claim 19, further comprising:

calculating a UE position and a UE velocity based at least in part on at least one of:

a UE location vector that is based at least in part on a GNSS position fix associated with the UE, a UE velocity vector that is based at least in part on the GNSS position fix associated with the UE, a UE acceleration vector that is based at least in part on the UE velocity vector, a UE location vector update, or a UE velocity vector update, wherein calculating the first Doppler shift is based at least in part on the UE position and the UE velocity.

21. The method of claim 18, wherein calculating the first Doppler shift comprises:
  calculating the first Doppler shift based at least in part on a satellite position associated with the satellite and a satellite velocity associated with the satellite.

22. The method of claim 21, wherein the ephemeris information is based at least in part on a position, velocity, time (PVT) format and an epoch time, and the method further comprises:
  calculating, based at least in part on the PVT format of the ephemeris information, the satellite position and the satellite velocity based at least in part on at least one of:
    a satellite location vector indicated by the ephemeris information,
    a satellite velocity vector indicated by the ephemeris information,
    a satellite acceleration vector associated with the satellite,
    a satellite location vector update associated with the satellite location vector, or
    a satellite velocity vector update associated with the satellite velocity vector.

23. The method of claim 18, wherein calculating the second Doppler shift comprises:
  calculating the second Doppler shift based at least in part on the timing advance parameter and an epoch time.

24. The method of claim 23, wherein calculating the second Doppler shift based at least in part on the timing advance parameter further comprises:
  calculating a propagation delay associated with the feeder link based at least in part on the timing advance parameter; and
  calculating the second Doppler shift based at least in part on the propagation delay.

25. The method of claim 18, further comprising:
  calculating a frequency correction associated with the downlink FTL based at least in part on the first Doppler shift; and
  modifying the downlink FTL based at least in part on the frequency correction.

26. The method of claim 18, further comprising:
  determining a sampling rate correction value based at least in part on the first Doppler shift and the second Doppler shift; and
  updating a system timer based at least in part on the sampling rate correction value.

27. A non-transitory computer-readable medium storing a set of instructions, the set of instructions comprising:
  one or more instructions that, when executed by one or more processors of a user equipment (UE), cause the UE to:
    receive ephemeris information associated with a satellite and a timing advance parameter associated with the satellite;
    modify, based at least in part on the ephemeris information, at least one of:
      a downlink frequency tracking loop (FTL), or
      a downlink time tracking loop (TTL);
    receive a downlink signal from the satellite based at least in part on modifying the downlink FTL or the downlink TTL;
    calculate a first Doppler shift associated with a service link between the satellite and the UE based at least in part on the ephemeris information;
    receive updated ephemeris information that indicates at least one of:
      an updated satellite location vector, or
      an updated satellite velocity vector;

calculate, based at least in part on the updated ephemeris information, at least one of:
    an updated satellite acceleration vector,
    an additional satellite location vector update, or
    an additional satellite velocity vector update;
  recalculate the first Doppler shift based at least in part on at least one of the updated satellite location vector, the updated satellite velocity vector, the updated satellite acceleration vector, the additional satellite location vector update, or the additional satellite velocity vector update; and
  modify the at least one of the downlink FTL or the downlink TTL based at least in part on the recalculated first Doppler shift.

28. The non-transitory computer-readable medium of claim 27, wherein the one or more instructions further cause the UE to:
  calculate a second Doppler shift associated with a feeder link between the satellite and a network entity based at least in part on the timing advance parameter,
    wherein the one or more instructions, that cause the UE to modify, based at least in part on the ephemeris information, at least one of the downlink FTL or the downlink TTL, cause the UE to:
  modify at least one of the downlink FTL or the downlink TTL based at least in part on the first Doppler shift or the second Doppler shift.

29. An apparatus, comprising:
  means for receiving ephemeris information associated with a satellite and a timing advance parameter associated with the satellite;
  means for modifying, based at least in part on the ephemeris information, at least one of:
    a downlink frequency tracking loop (FTL), or
    a downlink time tracking loop (TTL);
  means for receiving a downlink signal from the satellite based at least in part on modifying the downlink FTL or the downlink TTL;
  means for calculating a first Doppler shift associated with a service link between the satellite and a user equipment (UE) based at least in part on the ephemeris information;
  means for receiving updated ephemeris information that indicates at least one of:
    an updated satellite location vector, or
    an updated satellite velocity vector;
  means for calculating, based at least in part on the updated ephemeris information, at least one of:
    an updated satellite acceleration vector,
    an additional satellite location vector update, or
    an additional satellite velocity vector update;
  means for recalculating the first Doppler shift based at least in part on at least one of the updated satellite location vector, the updated satellite velocity vector, the updated satellite acceleration vector, the additional satellite location vector update, or the additional satellite velocity vector update; and
  means for modifying the at least one of the downlink FTL or the downlink TTL based at least in part on the recalculated first Doppler shift.

30. The apparatus of claim 29, further comprising:
  means for calculating a second Doppler shift associated with a feeder link between the satellite and a network entity based at least in part on the timing advance parameter, wherein the means for modifying, based at least in part on the ephemeris information, at least one of the downlink FTL or the downlink TTL further comprise:

means for modifying at least one of the downlink FTL or the downlink TTL based at least in part on the first Doppler shift or the second Doppler shift.

\* \* \* \* \*